United States Patent [19]

Sorrentino et al.

[11] Patent Number: 4,925,250

[45] Date of Patent: May 15, 1990

[54] DUAL WHEELS FOR A RADIO CONTROLLED TOY CAR

[76] Inventors: Michael Sorrentino; John Kidd, both of 4 Ridgewood Ave., Selden, N.Y. 11784

[21] Appl. No.: 264,788

[22] Filed: Oct. 31, 1988

[51] Int. Cl.⁵ .............................................. B60B 11/04
[52] U.S. Cl. .............................. 301/13 R; 301/36 R; 301/95
[58] Field of Search .............. 301/13 R, 13 SM, 36 R, 301/63 PW, 95, 96, 97, 98, 64 SD; 446/431, 465; D12/204, 208, 212

[56] References Cited

U.S. PATENT DOCUMENTS

| | | | |
|---|---|---|---|
| D. 171,011 | 12/1953 | Rosenberg | D34/15 |
| D. 190,641 | 6/1961 | Hibbard | D14/30 |
| D. 221,013 | 6/1971 | Golden | D34/15 |
| D. 249,678 | 9/1978 | Rotheiser | D12/204 |
| D. 276,513 | 11/1984 | Honsa | D12/135 |
| 1,863,031 | 6/1932 | Schippel | 301/36 R X |
| 2,698,566 | 1/1955 | Stough | 301/36 R X |
| 3,019,056 | 1/1962 | Keilman | 301/63 DS |
| 4,030,753 | 6/1977 | Meiners | 301/36 R |

FOREIGN PATENT DOCUMENTS

| | | | |
|---|---|---|---|
| 481101 | 1/1916 | France | 301/36 R |
| 0112201 | 5/1988 | Japan | 301/36 R |
| 8302921 | 9/1983 | World Int. Prop. O. | 301/13 R |

*Primary Examiner*—Russell D. Stormer
*Attorney, Agent, or Firm*—Jerry T. Kearns

[57] ABSTRACT

The present invention discloses front and rear wheel constructions which are adapted for use with 1/10 scale radio controlled toy cars. The wheel construction of the present invention enables a plurality of tires to be mounted on each wheel, thus extending the track width and providing a larger tread contact area. These features reduce the tendency of the cars to roll over and also enhance the acceleration and cornering performance of the cars.

1 Claim, 3 Drawing Sheets

DUAL WHEELS FOR A RADIO CONTROLLED TOY CAR

BACKGROUND OF THE INVENTION

1. Field of the Invention

The present inVention relates to dual wheels for radio controlled toy cars, and more particularly pertains front and rear wheel constructions specifically designed for use with 1/10 scale radio controlled toy cars. The driving and racing of small scale radio controlled cars is a large and growing hobby within the United States and throughout the world. Racing events are typically conducted on large parking lots with marked courses. Participants control their cars remotely by a conventional radio transmitter. The conventional form of cars utilize a single tire on each wheel. Because the track width of these small cars is typically quite narrow, they have a marked tendency to roll over, forcing the participant out of the race. Additionally, the tread width of the single tire is limited, thus reducing the acceleration and cornering potential of the car. In order to overcome these problems, the present invention provides a novel wheel construction which allows a plurality of tires to be mounted at each wheel, thus increasing the tread width contact area and the track width of the vehicle.

DESCRIPTION OF THE PRIOR ART

Various types of wheel constructions are known in the prior art. A typical example of such a wheel construction is to be found in U.S. Design Pat. No. 171,011, which issued to P. Rosenberg on Dec. 1, 1953. This patent discloses a tire mounted on a flanged sheet metal type wheel. U.S. Design Pat. No. 190,641, which issued to T. Hibbard on Jun. 20, 1961, discloses a mag wheel construction which is formed of coaxially assembled flanged sheet metal elements. U.S. Design Pat. No. 221,013, which issued to H. Golden on Jun. 29, 1971, discloses a toy vehicle wheel of a molded plastic construction. A vehicle tire is integrally molded with the wheel. U.S. Design Pat. No. 249,678, which issued to J. Rotheiser on Sept. 26, 1978, discloses a molded wheel with an integrally formed peripheral tread pattern. U.S. Design Pat. No. 276,513, which issued to H. Honsa on Nov. 27, 1984, discloses a combination wheel and tire having a plurality of radially extending flange or spokes.

While the above mentioned devices are suited for their intended usage, none of these devices disclose an integrally formed wheel capable of mounting a plurality of tires for use on small scale radio controlled toy cars. Inasmuch as the art is relatively crowded with respect to these various types of dual wheels for radio controlled toy cars, it can be appreciated that there is a continuing need for and interest in improvements to such dual wheels for radio controlled toy cars, and in this respect, the present invention addresses this need and interest.

SUMMARY OF THE INVENTION

In view of the foregoing disadvantages inherent in the known types of dual wheels for radio controlled toy cars now present in the prior art, the present invention provides an improved dual wheels for a radio controlled toy car. As such, the general purpose of the present invention, which will be described subsequently in greater detail, is to provide a new and improved dual wheels for a radio controlled toy car which has all the advantages of the prior art dual wheels for radio controlled toy cars and none of the disadvantages.

To attain this, a representative embodiment of the concepts of the present invention is illustrated in the drawings and makes use of front and rear wheel constructions which are adapted for use with 1/10 scale radio controlled toy cars. The wheel construction of the present invention enables a plurality of tires to be mounted on each wheel, thus extending the track width and providing a larger tread contact area. These features reduce the tendency of the cars to roll over and also enhance the acceleration and cornering performance of the cars.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved dual wheels for a radio controlled toy car which have all the advantages of the prior art wheels for radio controlled toy cars and none of the disadvantages.

It is another object of the present invention to provide new and improved dual wheels for a radio controlled toy car which may be easily and efficiently manufactured and marketed.

It is a further object of the present invention to provide new and improved dual wheels for a radio controlled toy car which is of a durable and reliable construction.

An even further object of the present invention is to provide new and improved dual wheels for a radio controlled toy car which is susceptible of a low cost of manufacture with regard to both materials and labor, and which accordingly is then susceptible of low prices of sale to the consuming public, thereby making such dual wheels economically available to the buying public.

Still yet another object of the present invention is to provide new and improved dual wheels for a radio controlled toy car which provides in the apparatuses and methods of the prior art some of the advantages thereof, while simultaneously overcoming some of the disadvantages normally associated therewith.

Still another object of the present invention is to provide new and improved dual wheels for a radio controlled toy car which provides an increased track width to reduce the frequency of roll over accidents.

Yet another object of the present invention is to provide new and improved dual wheels for a radio controlled toy car which has an increased tread width contact area to enhance acceleration and cornering performance.

Even still another object of the present invention is to provide new and improved dual wheels for a radio controlled toy car which may be retrofitted on existing radio controlled toy cars to enhance performance and appearance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
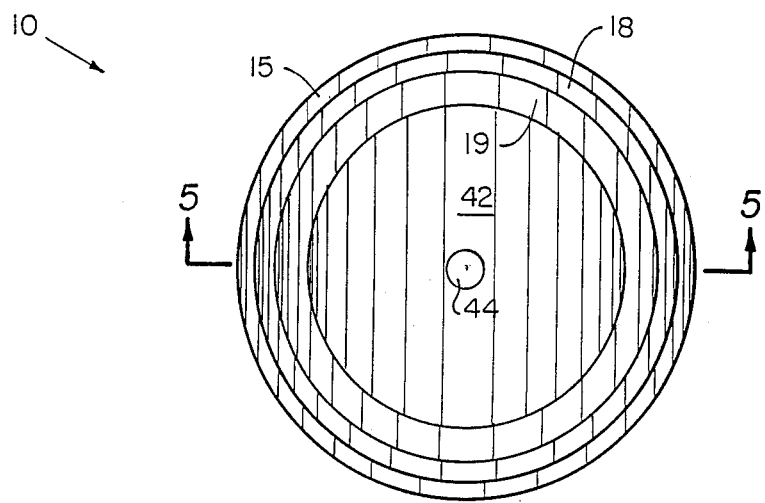
FIG. 1 is an end view of the rear wheel construction.

With reference now to the drawings, and in particular to FIG. 1 thereof, a new and improved dual wheels for a radio controlled toy car embodying the principles and concepts of the present invention and generally designated by the reference numeral 10 will be described.

Figure 2:
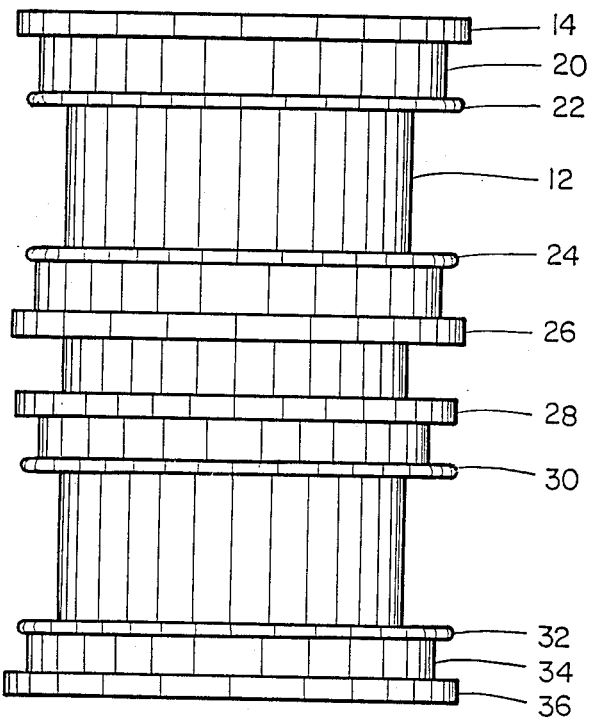
FIG. 2 is a side view of the rear wheel construction.
Figure 3:
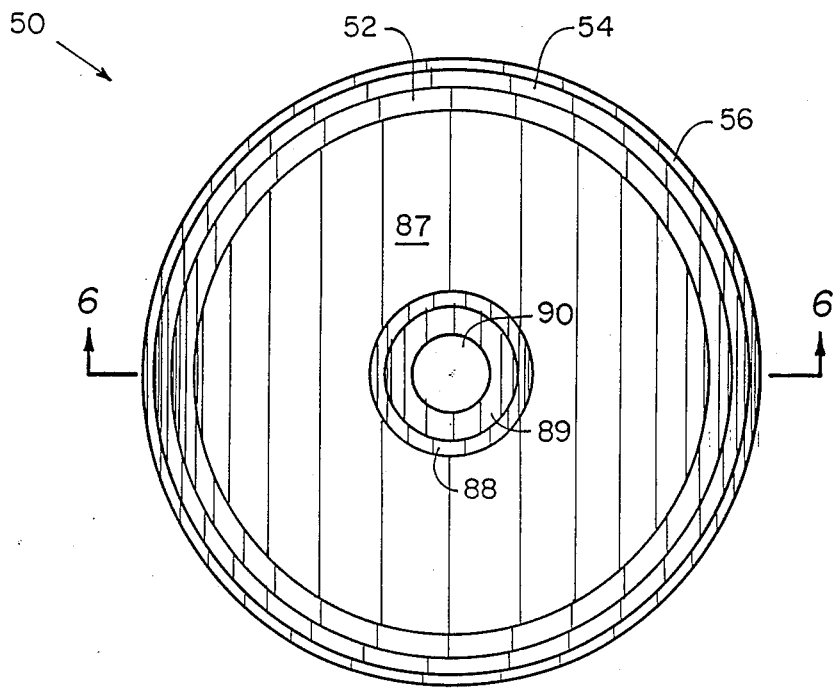
FIG. 3 is an end view of the front wheel construction.
Figure 4:
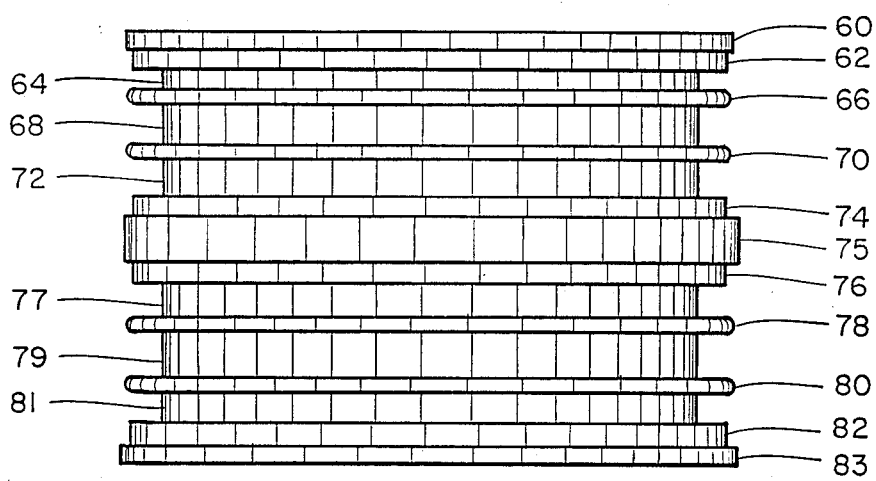
FIG. 4 is an side view of the front wheel construction.
Figure 6:
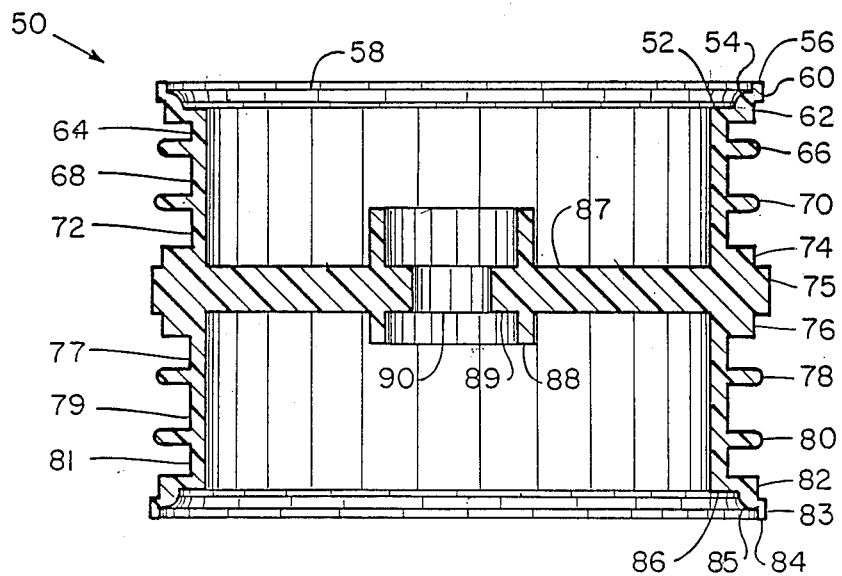
FIG. 6 is a longitudinal cross sectional view, taken along line 6—6 of FIG. 3, illustrating the front wheel construction.
Figure 5:
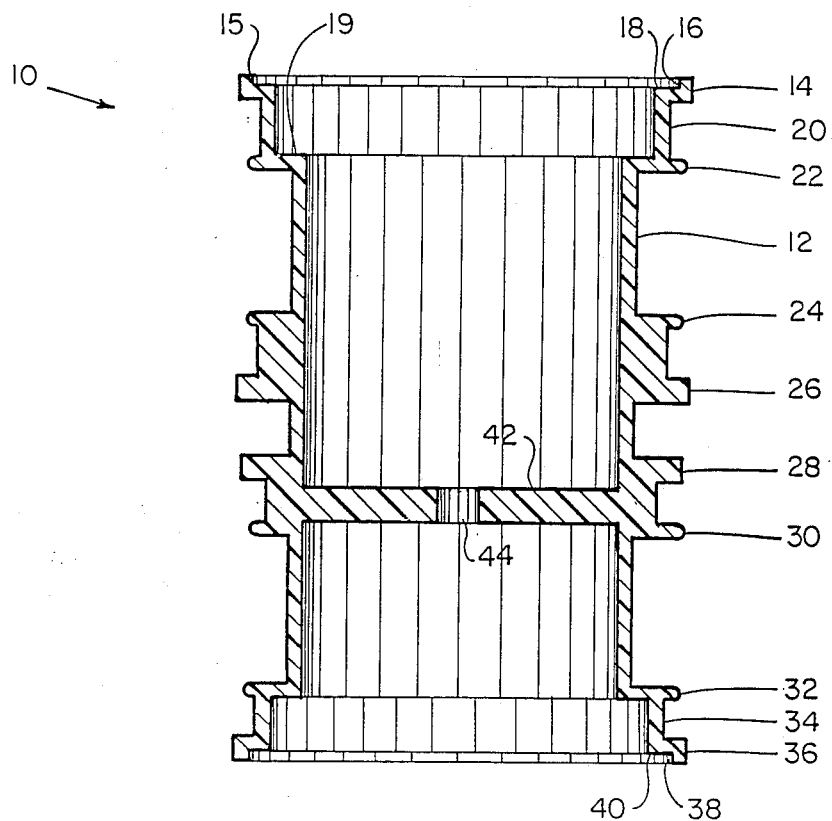
FIG. 5 is a longitudinal cross sectional view, taken along line 5—5 of FIG. 1, illustrating the rear wheel construction.

A wheel set utilized in providing dual wheels to a radio controlled toy car includes two rear wheels 10 as illustrated in FIGS. 1, 2 and 5 and two front wheels as illustrated in FIGS. 3, 4 and 6.

With reference now to FIGS. 1, 2 and 5, the construction of a rear wheel according to the present invention will now be described. The rear wheel has a hollow elongated generally cylindrical body portion 12 terminating in mirror symmetrical opposite end portions. Each of the opposite end portions has an outer radially extending flange having an annular end face 15 and a cylindrical side wall 14, 16. A stepped circular annular groove 16, 38 is formed interiorly of the outer flange and forms an outwardly facing annular abutment face 18, 40. A first stepped intermediate diameter portion 20, 34 is formed adjacent the outer flange and has a diameter greater than the cylindrical body portion 12 and less than the outer flange 14, 36. An outer radially extending bead retaining flange 22, 32 is formed adjacent the first intermediate stepped diameter portion 20, 34 and forms a first tire bead retaining groove. An intermediate, radially extending bead retaining flange 24, 30 is spaced inwardly along the cylindrical body 12 from the outer bead retaining flange 22, 32 and an inner radially extending bead retaining flange 26, 28 is spaced inwardly along the cylindrical body 12 from the intermediate retaining flange 24, 30. A second stepped intermediate diameter portion is formed between the intermediate 24, 30 and inner 26, 28 bead retaining flanges, and has a diameter greater than the cylindrical body portion 12 and less than the intermediate 24, 30 and inner 26, 28 bead retaining flanges and forms a second tire bead retaining groove. An interior transverse circular reinforcing wall 42 in the hollow cylindrical body is disposed between the opposite mirror symmetrical ends. A central cylindrical axial aperture 44 is formed through the reinforcing wall 42.

A pair of front wheels is also utilized in equipping a toy car with the dual wheels of the present invention. With reference now to FIGS. 3, 4 and 6, the construction of a front wheel will now be described. Each of the two front wheels of a set includes a cylindrical body portion 68, 79 terminating in mirror symmetrical opposite end portions. Each of the opposite end portions has an outer radially extending flange 60, 83 having an annular end face 56, 84 and a cylindrical side wall 60, 83. First and second stepped circular grooves 52, 54 and 86, 84 are formed interiorly of the outer flange 60, 83 and form outwardly facing annular abutment surfaces. The annular abutment surfaces are joined by a curved circular surface 54, 85. An outer radially extending bead retaining flange 66, 80 is spaced inwardly along the cylindrical body portion 68, 79 from the outer flange 60, 83 and forms a first tire bead retaining groove 64, 81. An intermediate radially extending bead retaining flange 70, 78 is spaced inwardly along the cylindrical body portion 68, 79 from the outer bead retaining flange 66, 80. An inner radially extending bead retaining flange 74, 76 is spaced inwardly along the cylindrical body portion 68, 79 from the intermediate bead retaining flange 70, 78 and forms a second tire bead retaining groove 72, 77. A centrally disposed transverse circular reinforcing wall 87 in the cylindrical body portion includes a central cylindrical axial aperture 90 formed therethrough and provided with a surrounding cylindrical bearing cup 88. In use, the axial is received with clearance through the aperture 90 and is supported by bearings received within the bearing cup 88. Thus, the front wheels rotate freely on a sporting axle. The rear wheels (FIG. 5), are secured for rotation with the rear axle of the toy car, which is received through the aperture 44. Suitable conventional fasteners may be utilized.

The wheels of the present invention may be formed integrally or may be assembled from separate components. A suitable material such as plastic or aluminum may be utilized. The dual wheels provide strong yet light weight assemblies which allow the mounting of dual wheels on conventional RC toy cars. The mounting of dual wheels increases the stability of such radio controlled toy cars, which are quite prone to flipping over during races. Additionally, the dual wheel mounting achieved utilizing the wheels of the present invention provides an attractive appearance to the vehicle. Suitable decorative wheel covers may be mounted, by frictional engagement or through the use of adhesives or other fastening means, in the undercut circular grooves on the outer end faces of the wheels. In addition to providing a cosmetic appearance enhancement, such wheel covers prevent the entry of dirt into the interior of the wheel, which could possibly ruin the wheel bearings.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A dual wheel set for a toy car, comprising:
   a pair of rear wheels, each of said rear wheels having an elongated generally cylindrical hollow body portion;
   said cylindrical body portion terminating in mirror symmetrical opposite end portions each having:
   (a) an outer radially extending flange having an annular end face and a cylindrical side wall;
   (b) a stepped circular annular groove formed interiorly of said outer flange, forming an outwardly facing annular abutment face;
   (c) a first stepped intermediate diameter portion formed adjacent said outer flange, and having a diameter greater than said cylindrical body portion and less than said outer flange;
   (d) an outer radially extending bead retaining flange formed adjacent said first intermediate stepped diameter portion, forming a first tire bead retaining groove;
   (e) an intermediate radially extending bead retaining flange spaced inwardly along said cylindrical body from said outer bead retaining flange;
   (f) an inner radially extending bead retaining flange spaced inwardly along said cylindrical body from said intermediate retaining flange;
   (g) a second stepped intermediate diameter portion formed between said intermediate and inner bead retaining flanges, and having a diameter greater than said cylindrical body portion and less than said intermediate and inner bead retaining flanges, forming a second tire bead retaining groove;
   an interior transverse circular reinforcing wall in said cylindrical body disposed between said opposite ends;
   a central cylindrical axial aperture formed through said reinforcing wall;
   a pair of front wheels, each of said front wheels having an elongated cylindrical hollow body portion;
   said cylindrical body portion terminating in mirror symmetrical opposite end portions, each having:
   (a) an outer radially extending flange having an annular end face in a cylindrical side wall;
   (b) first and second stepped circular grooves formed interiorly of said outer flange, forming first and second outwardly facing abutment faces joined by a curved circular surface;
   (c) an outer radially extending bead retaining flange spaced inwardly along said cylindrical body from said outer flange, forming a first tire bead retaining groove;
   (d) an intermediate radially extending bead retaining flange spaced inwardly along said cylindrical body portion from said outer bead retaining flange;
   (e) an inner radially extending bead retaining flange spaced inwardly along said cylindrical body from said intermediate bead retaining flange, forming a second tire bead retaining groove;
   a centrally disposed transverse circular reinforcing wall in said cylindrical body portion;
   a central cylindrical axial aperture formed through said reinforcing wall;
   and a cylindrical bearing cup surrounding said axial aperture and extending from opposite faces of said reinforcing wall.

* * * * *